US007428383B2

(12) United States Patent
Maciocco et al.

(10) Patent No.: US 7,428,383 B2
(45) Date of Patent: Sep. 23, 2008

(54) ARCHITECTURE, METHOD AND SYSTEM OF WDM-BASED PHOTONIC BURST SWITCHED NETWORKS

(75) Inventors: Christian Maciocco, Tigard, OR (US); Shlomo Ovadia, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 737 days.

(21) Appl. No.: 10/377,312

(22) Filed: Feb. 28, 2003

(65) Prior Publication Data

US 2004/0170431 A1    Sep. 2, 2004

(51) Int. Cl.
*H04Q 11/04* (2006.01)
*H04L 12/28* (2006.01)

(52) U.S. Cl. .............................. 398/45; 398/43; 398/48; 398/49; 398/50; 398/51; 398/66; 370/466

(58) Field of Classification Search .................. 398/43, 398/89, 45, 48–51, 66, 68, 79; 370/466
See application file for complete search history.

(56) References Cited

U.S. PATENT DOCUMENTS

| | | | |
|---|---|---|---|
| 4,663,748 | A | 5/1987 | Karbowiak et al. |
| 5,235,592 | A | 8/1993 | Cheng et al. |
| 5,331,642 | A | 7/1994 | Valley et al. |
| 5,457,556 | A | 10/1995 | Shiragaki |
| 5,506,712 | A | 4/1996 | Sasayama et al. |
| 5,550,803 | A | 8/1996 | Crayford et al. |
| 5,559,796 | A | 9/1996 | Edem et al. |
| 5,646,943 | A | 7/1997 | Elwalid |
| 5,768,274 | A | 6/1998 | Murakami et al. |

(Continued)

FOREIGN PATENT DOCUMENTS

CN    1384618    12/2002

(Continued)

OTHER PUBLICATIONS

Qiao, C., "Labeled Optical Burst Switching for IP-over-WDM Integration," IEEE Communications Magazine, (Sep. 2000), pp. 104-114.

(Continued)

*Primary Examiner*—Jason Chan
*Assistant Examiner*—Danny W Leung
(74) *Attorney, Agent, or Firm*—Blakely, Sokoloff, Taylor & Zafman LLP

(57) ABSTRACT

An intelligent photonic burst switched (PBS) network includes edge nodes and switching nodes. The PBS edge node includes a flow classifier, flow manager, and ingress/egress PBS MAC layer components. The flow classifier classifies information received from outside the PBS network into forward-equivalent classes. The flow manager determines whether the information is to be sent over the PBS network or elsewhere. Information to be sent over the PBS network is processed by the ingress PBS MAC layer component, which assembles the information into data bursts, schedules the transmission of the data burst, builds a control burst, and frames the data and control bursts, which are to be optically transmitted over the PBS network. The egress PBS MAC layer component receives control bursts and the corresponding data bursts, de-frames the data bursts, and appropriately assembles the data. The data is then classified and transmitted to the intended destination.

8 Claims, 11 Drawing Sheets

U.S. PATENT DOCUMENTS

| | | |
|---|---|---|
| 5,838,663 A | 11/1998 | Elwalid et al. |
| 5,970,050 A | 10/1999 | Johnson |
| 5,978,356 A | 11/1999 | Elwalid et al. |
| 6,111,673 A | 8/2000 | Chang et al. |
| 6,222,839 B1 | 4/2001 | Nakazaki et al. |
| 6,260,155 B1 | 7/2001 | Dellacona |
| 6,271,946 B1 | 8/2001 | Chang et al. |
| 6,272,117 B1 | 8/2001 | Choi et al. |
| 6,325,636 B1 | 12/2001 | Hipp et al. |
| 6,339,488 B1 | 1/2002 | Beshai et al. |
| 6,400,863 B1 | 6/2002 | Weinstock et al. |
| 6,411,506 B1 | 6/2002 | Hipp et al. |
| 6,466,586 B1 | 10/2002 | Darveau et al. |
| 6,487,686 B1 | 11/2002 | Yamazaki et al. |
| 6,490,292 B1 | 12/2002 | Matsuzawa |
| 6,498,667 B1 | 12/2002 | Masucci et al. |
| 6,519,062 B1 | 2/2003 | Yoo |
| 6,519,255 B1 | 2/2003 | Graves |
| 6,525,850 B1 | 2/2003 | Chang et al. |
| 6,542,499 B1 | 4/2003 | Murphy et al. |
| 6,545,781 B1 | 4/2003 | Chang et al. |
| 6,603,893 B1 | 8/2003 | Liu et al. |
| 6,615,382 B1 | 9/2003 | Kang et al. |
| 6,665,495 B1 | 12/2003 | Miles et al. |
| 6,671,256 B1 * | 12/2003 | Xiong et al. .......... 370/230 |
| 6,674,558 B1 | 1/2004 | Chang et al. |
| 6,690,036 B2 | 2/2004 | Liu et al. |
| 6,697,374 B1 | 2/2004 | Shraga et al. |
| 6,721,271 B1 | 4/2004 | Beshai et al. |
| 6,721,315 B1 | 4/2004 | Xiong et al. |
| 6,721,316 B1 * | 4/2004 | Epps et al. .......... 370/389 |
| 6,839,322 B1 | 1/2005 | Smith |
| 6,842,424 B1 | 1/2005 | Key et al. |
| 6,873,797 B2 | 3/2005 | Chang et al. |
| 6,898,205 B1 | 5/2005 | Chaskar et al. |
| 6,925,257 B2 | 8/2005 | Yoo |
| 6,940,863 B2 * | 9/2005 | Xue et al. .......... 370/401 |
| 6,956,868 B2 * | 10/2005 | Qiao .......... 370/466 |
| 6,987,770 B1 | 1/2006 | Yonge, III |
| 6,990,071 B2 | 1/2006 | Adam et al. |
| 7,023,846 B1 * | 4/2006 | Andersson et al. .......... 370/389 |
| 7,035,537 B2 | 4/2006 | Wang et al. |
| 7,092,633 B2 | 8/2006 | Fumagalli et al. |
| 7,106,968 B2 | 9/2006 | Lahav et al. |
| 2002/0018263 A1 | 2/2002 | Ge et al. |
| 2002/0018468 A1 | 2/2002 | Nishihara |
| 2002/0023249 A1 | 2/2002 | Ternullo et al. |
| 2002/0024700 A1 | 2/2002 | Yokoyama et al. |
| 2002/0027686 A1 | 3/2002 | Wada et al. |
| 2002/0063924 A1 | 5/2002 | Kimbrough et al. |
| 2002/0109878 A1 | 8/2002 | Qiao |
| 2002/0118419 A1 | 8/2002 | Zheng et al. |
| 2002/0141400 A1 | 10/2002 | DeMartino |
| 2002/0150099 A1 | 10/2002 | Pung et al. |
| 2002/0154360 A1 * | 10/2002 | Liu .......... 359/135 |
| 2002/0159114 A1 | 10/2002 | Sahasrabuddhe et al. |
| 2002/0186433 A1 | 12/2002 | Mishra |
| 2002/0186695 A1 | 12/2002 | Schwartz et al. |
| 2002/0196808 A1 | 12/2002 | Karri et al. |
| 2003/0002499 A1 | 1/2003 | Cummings et al. |
| 2003/0009582 A1 | 1/2003 | Qiao et al. |
| 2003/0016411 A1 | 1/2003 | Zhou et al. |
| 2003/0031198 A1 | 2/2003 | Currivan et al. |
| 2003/0037297 A1 | 2/2003 | Araki |
| 2003/0039007 A1 | 2/2003 | Ramadas et al. |
| 2003/0043430 A1 | 3/2003 | Handelman |
| 2003/0048506 A1 | 3/2003 | Handelman |
| 2003/0053475 A1 | 3/2003 | Veeraraghavan et al. |
| 2003/0067880 A1 | 4/2003 | Chiruvolu |
| 2003/0099243 A1 * | 5/2003 | Oh et al. .......... 370/395.21 |
| 2003/0120799 A1 | 6/2003 | Lahav et al. |
| 2003/0189933 A1 | 10/2003 | Ozugur et al. |
| 2003/0198471 A1 | 10/2003 | Ovadia |
| 2003/0214979 A1 | 11/2003 | Kang et al. |
| 2004/0004966 A1 | 1/2004 | Foster et al. |
| 2004/0052525 A1 | 3/2004 | Ovadia |
| 2004/0062263 A1 | 4/2004 | Charcranoon et al. |
| 2004/0120261 A1 | 6/2004 | Ovadia |
| 2004/0131061 A1 | 7/2004 | Matsuoka et al. |
| 2004/0156325 A1 | 8/2004 | Perkins et al. |
| 2004/0156390 A1 | 8/2004 | Prasad et al. |
| 2004/0170165 A1 | 9/2004 | Maciocco et al. |
| 2004/0170431 A1 | 9/2004 | Maciocco et al. |
| 2004/0208171 A1 | 10/2004 | Ovadia et al. |
| 2004/0208172 A1 | 10/2004 | Ovadia et al. |
| 2004/0208544 A1 | 10/2004 | Ovadia |
| 2004/0208554 A1 | 10/2004 | Wakai et al. |
| 2004/0234263 A1 | 11/2004 | Ovadia et al. |
| 2004/0252995 A1 | 12/2004 | Ovadia et al. |
| 2004/0258407 A1 | 12/2004 | Maciocco et al. |
| 2004/0264960 A1 | 12/2004 | Maciocco et al. |
| 2005/0030951 A1 | 2/2005 | Maciocco et al. |
| 2005/0063701 A1 | 3/2005 | Ovadia et al. |
| 2005/0068968 A1 | 3/2005 | Ovadia et al. |
| 2005/0068995 A1 | 3/2005 | Lahav et al. |
| 2005/0089327 A1 | 4/2005 | Ovadia et al. |
| 2005/0105905 A1 | 5/2005 | Ovadia et al. |
| 2005/0152349 A1 | 7/2005 | Takeuchi et al. |
| 2005/0175183 A1 | 8/2005 | Ovadia et al. |
| 2005/0175341 A1 | 8/2005 | Ovadia |
| 2005/0177749 A1 | 8/2005 | Ovadia |
| 2005/0259571 A1 | 11/2005 | Battou |
| 2006/0008273 A1 | 1/2006 | Xue et al. |

FOREIGN PATENT DOCUMENTS

| | | |
|---|---|---|
| CN | 1406000 | 3/2003 |
| CN | 1426189 | 6/2003 |
| EP | 0876076 A2 | 11/1998 |
| EP | 1 073 306 A | 1/2001 |
| EP | 1073307 | 1/2001 |
| EP | 1089498 A2 | 4/2001 |
| EP | 1122971 | 8/2001 |
| EP | 1135000 A1 | 9/2001 |
| EP | 1217862 | 6/2002 |
| EP | 1303111 A2 | 4/2003 |
| EP | 1 351 458 A1 | 10/2003 |
| WO | WO 01/19006 | 3/2001 |
| WO | WO 01/67694 | 9/2001 |
| WO | WO 01/76160 A1 | 10/2001 |
| WO | WO 01/86998 A | 11/2001 |
| WO | WO 02/41663 | 5/2002 |
| WO | WO 02/067505 A1 | 8/2002 |
| WO | PCT/US2004/002790 | 6/2004 |

OTHER PUBLICATIONS

Chaskar, H., et al., "Robust Trasnport of IP Traffic Over WDM Using Optical Burst Switching," Optical Networks Magazine, (Jul./Aug. 2002), pp. 47-60.

Oh, Se-Yoon et al., "A Data Burst Assembly Algorithm in Optical Burst Switching Networks," ETRI Journal, Aug. 2002, pp. 311-322, vol. 24, No. 4, Electronics and Telecommunications Research Institute, Tejon, Korea.

IETF Networking Group RFC Standards Track, "Generalized Multi-Protocol Label Switching (GMPLS) Signaling Functional Description," Jan. 2003. Retrieved on Jul. 8, 2004 from http://www.ietf.org/rfc/rfc3471.txt.

Liu, Hang et al., "GMPLS-Based Control Plane for Optical Networks: Early Implementation Experience," Proceedings of the SPIE, Jul. 29, 2002, pp. 220-229, vol. 4872, SPIE, Bellingham, VA, US.

Ghani, Nasir et al., "On IP-over-WDM Integration", IEEE Communications Magazine, Mar. 2000, pp. 72-84.

Yoo, S.J. Ben, "Optical-label switching, MPLS, MPLambdaS, and GMPLS", Optical Networks Magazine, May/Jun. 2003, pp. 17-31.

Rekhter, Y. et al., "A Border Gateway Protocol 4 (BGP-4)", Network Working Group, Mar. 1995, pp. 1-57.

Office Action mailed on Nov. 29, 2006. Ovadia et al., "Architecture, Method and System of Multiple High-Speed Servers to Network in WDM Based Photonic Burst-Switched Networks," U.S. Appl. No. 10/417,823, filed Apr. 16, 2003.

Cao, Xiaojun et al., "Assembling TCP/IP Packets in Optical Burst Switched Networks", IEEE Global Telecommunications Conference, New York, 2002, vol. 1, pp. 2808-2812.

Wang, S.Y., "Using TCP Congestion Control to Improve the Performance of Optical Burst Switched Networks", IEEE International Conference on Communications, Taiwan, 2003, pp. 1438-1442.

Detti, Andrea et al., "Impact of Segments Aggregation on TCP Reno Flows in Optical Burst Switching Networks", IEEE Infocom, New York, 2002, vol. 1, pp. 1803-1805.

Ovadia et al., "Dynamic Route Discovery for Optical Switched Networks," U.S. Appl. No. 10/691,712, filed Oct. 22, 2003, Office Action mailed on Nov. 14, 2006.

Ovadia et al., "Architecture and Method for Framing Optical Control and Data Bursts Within Optical Transport Unit Structures in Photonic Burst-Switched Networks," U.S. Appl. No. 10/441,771, filed May 19, 2003, Office Action mailed on Nov. 15, 2006.

Maciocco et al., "Adaptive Framework for Closed-Loop Protocols Over Photonic Burst Switched Networks," U.S. Appl. No. 10/464,969, filed Jun. 18, 2003, Office Action mailed on Nov. 22, 2006.

Gambini et al., "Transparent Optical Packet Switching: Network Architecture and Demonstrators in the KEOPS Project," IEEE Journal of Selected Areas in Communications, vol. 16, No. 7, Sep. 1998, pp. 1245-1259.

Guillemot et al., "Transparent Optical Packet Switching: The European ACTS KEOPS Project Approach," Journal of Lightwave Technology, vol. 16, No. 12, Dec. 1998, pp. 2117-2134.

Jacob et al., "Delay Performance of Some Scheduling Strategies in an Input Queuing ATM with Multiclass Bursty Traffic," IEEE/ACM Transactions on Networking, vol. 4, No. 2, Apr. 1996, pp. 258-271.

Mehrotra, Pronita, et al., "Network Processor Design for Optical Burst Switched Networks," Proceedings of the 14th Annual IEEE International ASIC/SOC Conference, Sep. 12-15, 2001, pp. 296-300.

Ovadia, Shlomo et al., "Photonic Burst Switching (PBS) Architecture for Hop and Span-Constrained Optical Networks," IEEE Optical Communications, vol. 41, No. 11, Nov. 2003, pp. S24-S32.

Yoo et al., "Optical Burst Switching for Service Differentiation in the Next-Generation Optical Internet," IEEE Communications Magazine, Feb. 2001, pp. 98-104.

Office Action mailed on Jan. 12, 2007. U.S. Appl. No. 10/242,839, filed Sep. 13, 2002, Ovadia et al.

Office Action mailed on Mar. 21, 2007. U.S. Appl. No. 10/713,585, filed Nov. 13, 2002, Ovadia et al.

Final Office Action mailed on Jan. 17, 2007. U.S. Appl. No. 10/606,323, filed Jun. 24, 2003.

Office Action mailed on Feb. 20, 2007. U.S. Appl. No. 10/377,580, filed Feb. 28, 2003.

Final Office Action mailed on Jan. 17, 2007. Maciocco et al., "Generic Multi-Protocol Label Switching (GMPLS)-Based Label Space Architecture for Optical Switched Networks," U.S. Appl. No. 10/606,323, filed Jun. 24, 2003.

Office Action mailed on Feb. 20, 2007. Maciocco et al., "Method and System to Frame and Format Optical Control and Data Bursts in WDM-Based Photonic Burst Switched Networks", U.S. Appl. No. 10/377,580, filed Feb. 28, 2003.

Office Action mailed on Dec. 29, 2006. Ovadia et al., "Modular Reconfigurable Multi-Server System and Method for High-Speed Networking Within Photonic Burst-Switched Networks," U.S. Appl. No. 10/418,487, filed Apr. 17, 2003.

Office Action mailed on Jan. 3, 2007. Ovadia et al., "Method and System to Recover Resources in the Event of Data Burst Loss Within WDM-Based Optical-Switched Networks," U.S. Appl. No. 10/668,874, filed Sep. 23, 2003.

Office Action mailed on Jan. 10, 2007. Maciocco et al., "Generic Multi-Protocol Label Switching (GMPLS) Signaling Extensions for Optical Switched Networks," U.S. Appl. No. 10/636,062, filed Aug. 6, 2003.

Yoo et al., "Optical Burst Switching for Service Differentiation in the Next-Generation Optical Internet," IEEE Communications Magazine, Feb. 2001, pp. 98-104.

Mike J. O'Mahony, et al., "The Application of Optical Packet Switching in Future Communication Networks", IEEE Communications Magazine, Mar. 2001.

Shun Yao, et al., "All-Optical Packet Switching for Metropolitan Area Networks: Opportunities and Challenges", IEEE Communications Magazine, Mar. 2001.

Dr. Chunming Qiao, et al., "Optical Burst Switching", Business Briefing: Global Photonics Applications and Technology, 1999.

Chunming Qiao, "Labeled Optical Burst Switching for IP-over-WDM Integration", IEEE Communications Magazine, Sep. 2000.

A. Carena, et al., "OPERA: An Optical Packet Experimental Routing Architecture with Label Swapping Capability", Journal of Lightwave Technology, vol. 16, No. 12, Dec. 1998.

Wen De Zhong, "A New Wavelength-Routed Photonic Packet Buffer Combining Traveling Delay Lines with Delay-Line Loops", Journal of Lightwave Technology, vol. 19, No. 8, Aug. 2001.

D. Wiesmann et al., "Apodized Surface-Corrugated Gratings with Varying Duty Cycles", IEEE Photonics Technology Letter, vol. 12, No. 6, Jun. 2000.

Kenneth O. Hill, et al., "Fiber Bragg Grating Technology Fundamentals and Overview", Journal of Lightwave Technology, vol. 15, No. 8, Aug. 1997.

Turan Erdogan, "Fiber Grating Spectra", Journal of Lightwave Technology, vol. 15, No. 8, Aug. 1997.

K. Sugden, et al., "Fabrication and Characterization of Bandpass Filters Based on Concatenated Chirped Faber Gratings", Journal of Lightwave Technology, vol. 15, No. 8, Aug. 1997.

C.R. Giles, "Lightwave Applications of Fiber Bragg Gratings", Journal of Lightwave Technology, vol. 15, No. 8, Aug. 1997.

A. E. Willner, et al., "Tunable Compensation of Channel Degrading Effects Using Nonlinearly Chirped Passive Fiber Bragg Gratings", IEEE Journal of Selected Topics in Quantum Electronics, vol. 5, No. 5 Sep./Oct. 1999.

P. V. Studenkov et al., "Asymmetric Twin-Waveguide 1.55 μm Wavelength Laser with a Distributed Bragg Reflector", IEEE Photonic Technology Letters, vol. 12., No. 5, May 2000.

Yasuo Shibata et al., "Coupling Coefficient Modulation of Waveguide Grating Using Sampled Grating", IEEE Photonics Technology Letters, vol. 6, No. 10, Oct. 1994.

Gallaher, Rick, "An Introduction to MPLS", Course Director for Global Knowledge and President of Telecommunications Technical Services, Inc., Sep. 10, 2001, pp. 1-7.

"Compare SANs to Alternate Technologies", Brocade, Retrieved on Feb. 26, 2003 from http://www.brocade.com/san/evaluate/compare_san.jsp.

Ravi Kumar Khattar, et, "Introduction to Storage Area Network, SAN", International Technical Support Organization, Aug. 1999, www.redbooks.ibm.com.

Sahara, A. et al., "Demonstration of Optical Burst Data Switching Using Photonic MPLS Routers Operated by GMPLS Signaling," OFC 2003, vol. 1, pp. 220-222.

Qiao, C. et al., "Polymorphic Control for Cost-Effective Design of Optical Networks", European transactions on Telecommunications, vol. 11, No. 1, Jan.-Feb. 2000, pp. 17-26.

Baldine, I. et al., "Jumpstart: A Just-in-Time Signaling Architecture for WDM Burst-Switched Networks", IEEE Communications Magazine, Feb. 2002, pp. 82-89.

Comellas, J. et al., "Integrated IP/WDM Routing in GMPLS-Based Optical Networks", IEEE Network, Mar./Apr. 2003, pp. 22-27.

Cidon, I. et al., "Connection Establishment in High-Speed Networks", IEEE/ACM Transactions on Networking, No. 4, Aug. 1993, pp. 469-481.

Floyd, Sally et al., "Modifying TCP's Congestion Control for High Speeds", May 5, 2002, pp. 1-5.

Fredj, S. Ben et al., "Statistical Bandwidth Sharing: A Study of Congestion at Flow Level", France Telecom R&D, pp. 111-122, Oct. 2001.

Zeljkovic, Nada et al., "A Simulation Analysis of Statistical Multiplexing in Frame Relay and ATM Internetworking", Telesiks 2001, Sep. 19-21, 2001, Nis, Yugoslavia, pp. 116-119.

Kumaran, Krishnan et al., "Multiplexing Regulated Traffic Streams: Design and Performance", Bell Laboratories/Lucent Technologies, IEEE Infocom 2001, pp. 527-536.

Su, C.-F. et al., "On Statistical Multiplexing, Traffic Mixes, and VP Management", University of Texas at Austin, 1998 IEEE.

Brown, Timothy X., "Adaptive Statistical Multiplexing for Broadband Communication", Performance Evaluation and Application of ATM Networks, Kouvatsos, D. editor, Kluwer, 2000, pp. 51-80.

Walch, Philip F., "FEC Standards and Long Haul STM-64 DWDM Transmission," Contribution to T1 Standards Project T1X1.5, Jan. 17-20, 2000, pp. 1-4.

"ITU-T Rec. G.709/Y.1331—Interfaces for the Optical Transport Network (OTN)", International Telecommunication Union, Mar. 2003, pp. 1-109.

Henderson, Michael, "Forward Error Correction in Optical Network," Mar. 27, 2001. http://members.cox.net/michaeo.henderson/Papers/Optical_FEC.pdf, pp. 1-18.

Wei, Wei et al., "GMPLS-Based Hierarchical Optical Routing Switching Architecture", Proceedings of SPIE, vol. 4585, 2001, pp. 328-334.

Banerjee, A. et al., "Generalized Multiprotocol Label Switching: An Overview of Routing and Management Enhancements," IEEE Communications Magazine, Jan. 2001, pp. 144-150.

Kim, Y. et al., "Discrete Event Simulation of the DiffServ-over-GMPLS Lightwave Agile Switching Simulator (GLASS)," Joint Conference on Communication and Information -2002, Jeju, Korea.

Ovadia et al., "Architecture and Method for Framing Control and Data Bursts Over 10 GBIT Ethernet With and Without Wan Interface Sublayer Support", U.S. Appl. No. 10/459,781, filed Jun. 11, 2003, Office Action mailed on Oct. 18, 2006.

Maciocco et al., "Method and System to Frame and Format Optical Control and Data Bursts in WDM-Based Photonic Burst Switched Networks", U.S. Appl. No. 10/377,580, filed Feb. 28, 2003, Final Office Action mailed on Oct. 26, 2006.

* cited by examiner

OPTICAL DATA BURST FORMAT

OPTICAL CONTROL BURST FORMAT

ARCHITECTURE, METHOD AND SYSTEM OF WDM-BASED PHOTONIC BURST SWITCHED NETWORKS

CROSS REFERENCE TO RELATED APPLICATIONS

The present application is related to U.S. patent application Ser. No. 10/126,091, filed Apr. 17, 2002, U.S. patent application Ser. No. 10/183,111, filed Jun. 25, 2002, U.S. patent application Ser. No. 10/328,571, filed Dec. 24, 2002, and co-filed U.S. patent application Ser. No. 10/377,580.

FIELD OF THE INVENTION

An embodiment of the present invention relates to optical networks in general; and, more specifically, to control and data processing of photonic burst switched networks.

BACKGROUND INFORMATION

Transmission bandwidth demands in telecommunication networks (e.g., the Internet) appear to be ever increasing and solutions are being sought to support this bandwidth demand. One solution to this problem is to use fiber-optic networks, where wavelength-division-multiplexing (WDM) technology is used to support the ever-growing demand in optical networks for higher data rates.

Conventional optical switched networks typically use wavelength routing techniques, which require that optical-electrical-optical (O-E-O) conversion of optical signals be done at the optical switches. O-E-O conversion at each switching node in the optical network is not only very slow operation (typically about ten milliseconds), but it is very costly, and potentially creates a traffic bottleneck for the optical switched network. In addition, the current optical switch technologies cannot efficiently support "bursty" traffic that is often experienced in packet communication applications (e.g., the Internet).

A large communication network can be implemented using several sub-networks. For example, a large network to support Internet traffic can be divided into a large number of relatively small access networks operated by Internet service providers (ISPs), which are coupled to a number of metropolitan area networks (Optical MANs), which are in turn coupled to a large "backbone" wide area network (WAN). The optical MANs and WANs typically require a higher bandwidth than local-area networks (LANs) in order to provide an adequate level of service demanded by their high-end users. However, as LAN speeds/bandwidth increase with improved technology, there is a need for increasing MAN/WAN speeds/bandwidth.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF PREFERRED EMBODIMENTS

Figure 1:
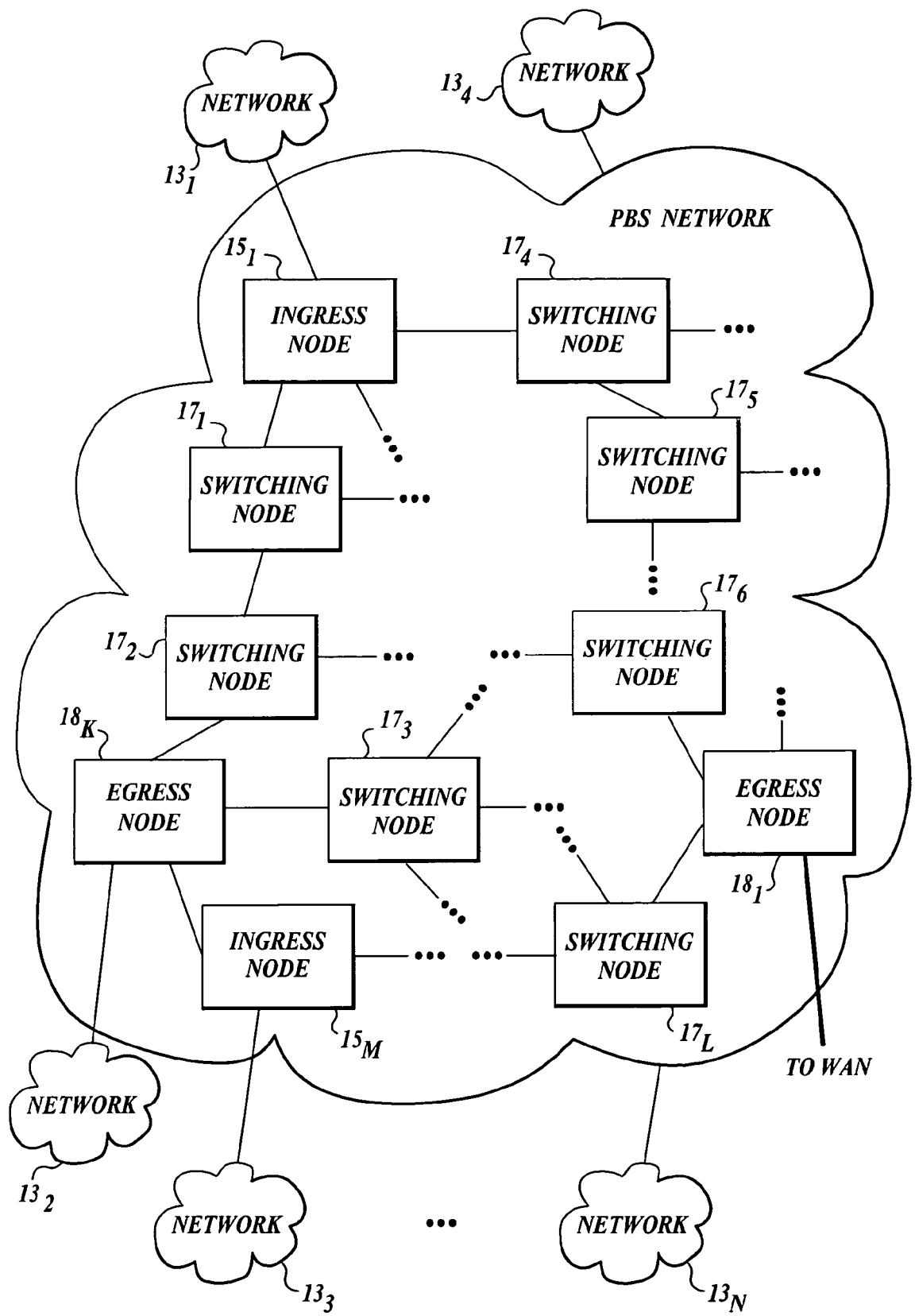
FIG. 1 is a simplified block diagram illustrating a photonic burst switched network with variable time slot provisioning, according to one embodiment of the present invention.

FIG. 1 illustrates a photonic burst-switched (PBS) network 10, according to one embodiment of the present invention. The term photonic burst is used herein to refer to statistically-multiplexed packets (e.g., Internet protocol (IP) packets or Ethernet frames) having similar routing requirements). A photonic burst typically includes a photonic label containing the header and other routing information of the IP packets and a payload containing the data segments of the packets.

This embodiment of PBS network 10 includes local area networks (LANs) $13_1$-$13_N$ and a backbone optical WAN (not shown). In addition, this embodiment of PBS network 10 includes ingress nodes $15_1$-$15_M$, switching nodes $17_1$-$17_L$, and egress nodes $18_1$-$18_K$. PBS network 10 can include other ingress, egress and switching nodes (not shown) that are interconnected with the switching nodes shown in FIG. 1. The ingress and egress nodes are also referred to herein as edge nodes in that they logically reside at the edge of the PBS network. The edge nodes, in effect, provide an interface between the aforementioned "external" networks (i.e., external to the PBS network) and the switching nodes of the PBS network. In this embodiment, the ingress, egress and switching nodes are implemented with intelligent modules. This embodiment can be used, for example, as a metropolitan area network connecting a large number of LANs within the metropolitan area to a large optical backbone network.

In some embodiments, the ingress nodes perform optical-electrical (OE) conversion of received optical signals, and include electronic memory to buffer the received signals until they are sent to the appropriate LAN. In addition, in some embodiments, the ingress nodes also perform electrical-optical (EO) conversion of the received electrical signals before they are transmitted to switching nodes $17_1$-$17_M$ of PBS network 10.

Egress nodes are implemented with optical switching units or modules that are configured to receive optical signals from other nodes of PBS network 10 and route them to the optical WAN or other external networks. Egress nodes can also receive optical signals from the optical WAN or other external network and send them to the appropriate node of PBS network 10. In one embodiment, egress node 18₁ performs O-E-O conversion of received optical signals, and includes electronic memory to buffer received signals until they are sent to the appropriate node of PBS network 10 (or to the optical WAN).

Switching nodes $17_1$-$17_L$ are implemented with optical switching units or modules that are each configured to receive optical signals from other switching nodes and appropriately route the received optical signals to other switching nodes of PBS network 10. As is described below, the switching nodes perform O-E-O conversion of optical control bursts and network management control burst signals. In some embodiments, these optical control bursts and network management control bursts are propagated only on preselected wavelengths. The preselected wavelengths do not propagate optical burst "data" (as opposed to control bursts and network management control bursts) signals in such embodiments, even though the burst and network management control bursts may be include necessary information for a particular group of optical data burst signals. The control and data information is transmitted on separate wavelengths in some embodiments. In other embodiments, control and data information may be sent on the same wavelengths (also referred to herein as in-band signaling). In another embodiment, optical control bursts, network management control bursts, and optical data burst signals may be propagated on the same wavelength(s) using different encoding schemes such as different modulation formats, etc. In either approach, the optical control bursts and network management control bursts are sent asynchronously relative to its corresponding optical data burst signals. In still another embodiment, the optical control bursts and other control signals are propagated at different transmission rates as the optical data signals.

Although switching nodes $17_1$-$17_L$ may perform O-E-O conversion of the optical control signals, in this embodiment, the switching nodes do not perform O-E-O conversion of the optical data burst signals. Rather, switching nodes $17_1$-$17_L$ perform optical switching (e.g., without O-E-O conversion) of the optical data burst signals. Thus, the switching nodes can include electronic circuitry to store and process the incoming optical control bursts and network management control bursts that were converted to an electronic form and use this information to configure photonic burst switch settings, and to properly route the optical data burst signals corresponding to the optical control bursts. The new control bursts, which replace the previous control bursts based on the new routing information, are converted to an optical control signal, and it is transmitted to the next switching or egress nodes. Embodiments of the switching nodes are described further below.

Elements of exemplary PBS network 10 are interconnected as follows. LANs $13_1$-$13_N$ are connected to corresponding ones of ingress nodes $15_1$-$15_M$. Within PBS network 10, ingress nodes $15_1$-$15_M$ and egress nodes $18_1$-$18_K$ are connected to some of switching nodes $17_1$-$17_L$ via optical fibers. Switching nodes $17_1$-$17_L$ are also interconnected to each other via optical fibers in mesh architecture to form a relatively large number of lightpaths or optical links between the ingress nodes, and between ingress nodes $15_1$-$15_L$ and egress nodes $18_1$-$18_K$. Ideally, switching nodes $17_1$-$17_L$ provide more than one lightpath between each endpoint of PBS network 10 (i.e., the ingress nodes and egress nodes are endpoints within PBS network 10). Multiple lightpaths between switching nodes, ingress nodes, and egress nodes enable protection switching when one or more node fails, or can enable features such as primary and secondary route to destination.

As described below in conjunction with FIG. 2, the ingress, egress and switching nodes of PBS network 10 are configured to send and/or receive optical control bursts, optical data burst, and other control signals that are wavelength multiplexed so as to propagate the optical control bursts and control labels on pre-selected wavelength(s) and optical data burst or payloads on different preselected wavelength(s). Still further, the edge nodes of PBS network 10 can send optical control burst signals while sending data out of PBS network 10 (either optical or electrical).

Figure 2:
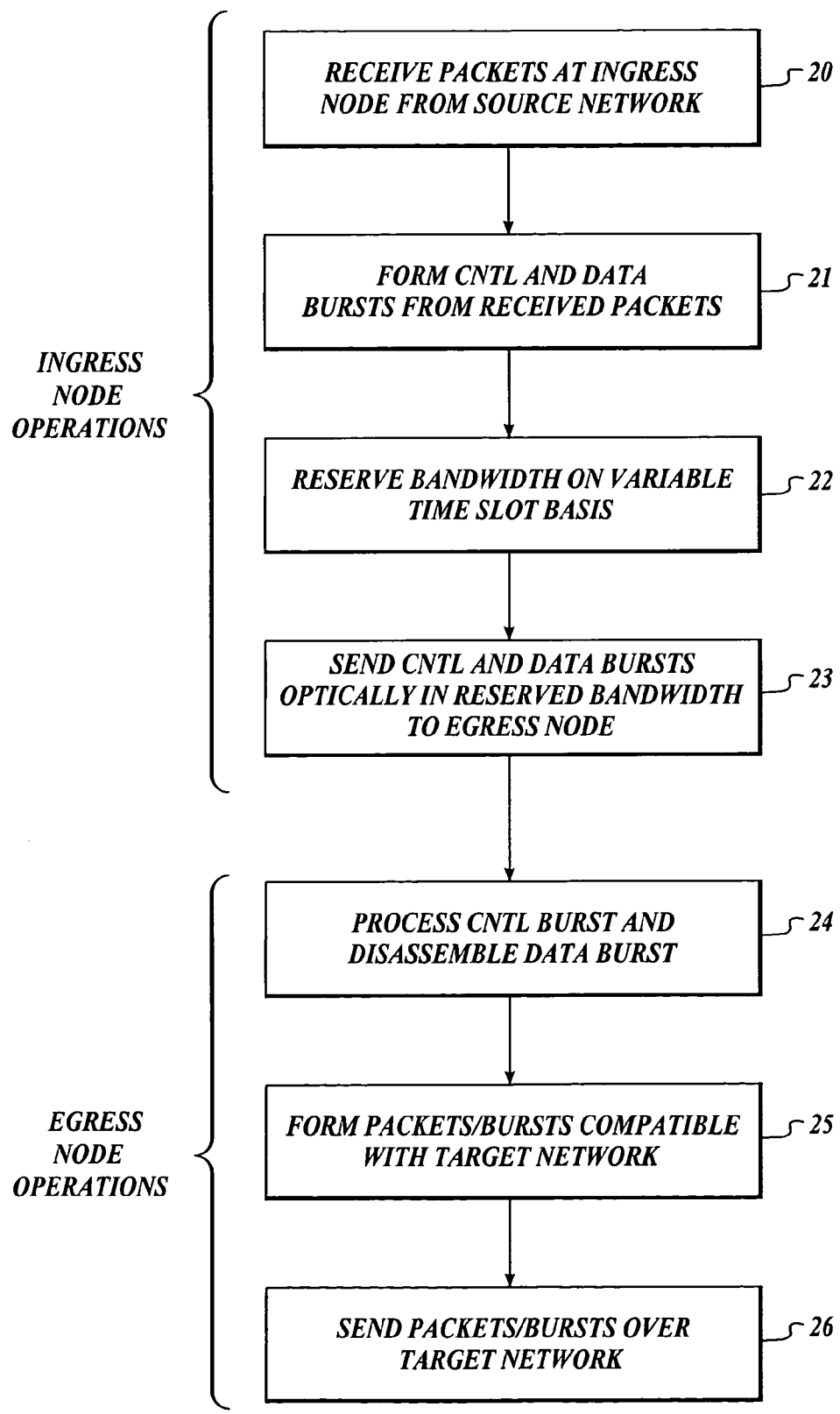
FIG. 2 is a simplified flow diagram illustrating the operation of a photonic burst switched network, according to one embodiment of the present invention.

FIG. 2 illustrates the operational flow of PBS network 10, according to one embodiment of the present invention. Referring to FIGS. 1 and 2, photonic burst switched network 10 operates as follows.

PBS network 10 receives packets from LANs $13_1$-$13_N$. In one embodiment, PBS network 10 receives IP packets at ingress nodes $15_1$-$15_M$. The received packets can be in electronic form rather than in optical form, or received in optical form and then converted to electronic form. In this embodiment, the ingress nodes store the received packets electronically. A block 20 represents this operation.

For clarity, the rest of the description of the operational flow of PBS network 10 focuses on the transport of information from ingress node $15_1$ to egress node $18_1$. The transport of information from ingress nodes $15_2$-$15_M$ to egress node $18_1$ (or other egress nodes) is substantially similar.

An optical burst label (i.e., an optical control burst) and optical payload (i.e., an optical data burst) are formed from the received packets. In one embodiment, ingress node $15_1$ uses statistical multiplexing techniques to form the optical data burst from the received IP (Internet Protocol) packets stored in ingress node $15_1$. For example, packets received by ingress node $15_1$ and having to pass through egress node $18_1$ on their paths to a destination can be assembled into an optical data burst payload. A block 21 represents this operation.

Bandwidth on a specific optical channel and/or fiber is reserved to transport the optical data burst through PBS network 10. In one embodiment, ingress node $15_1$ reserves a time slot (i.e., a time slot of a TDM system) in an optical data signal path through PBS network 10. This time slot maybe fixed-time duration and/or variable-time duration with either uniform or non-uniform timing gaps between adjacent time slots. Further, in one embodiment, the bandwidth is reserved for a time period sufficient to transport the optical burst from the ingress node to the egress node. For example, in some embodiments, the ingress, egress, and switching nodes maintain an updated list of all used and available time slots. The time slots can be allocated and distributed over multiple wavelengths and optical fibers. Thus, a reserved time slot (also referred to herein as a TDM channel), which in different embodiments may be of fixed-duration or variable-duration, may be in one wavelength of one fiber, and/or can be spread across multiple wavelengths and multiple optical fibers. A block 22 represents this operation.

When an ingress and/or egress node reserves bandwidth or when bandwidth is released after an optical data burst is transported, a network controller (not shown) updates the list. In one embodiment, the network controller and the ingress or egress nodes perform this updating process using various burst or packet scheduling algorithms based on the available network resources and traffic patterns. The available variable-duration TDM channels, which are periodically broadcasted to all the ingress, switching, and egress nodes, are transmitted on the same wavelength as the optical control bursts or on a different common preselected wavelength throughout the optical network. The network controller function can reside in one of the ingress or egress nodes, or can be distributed across two or more ingress and/or egress nodes. In this embodiment, the network controller is part of control unit 37 (FIG. 3), which can include one or more processors.

The optical control bursts, network management control labels, and optical data bursts are then transported through photonic burst switched network 10 in the reserved TDM channel. In one embodiment, ingress node 15$_1$ transmits the control burst to the next node along the optical label-switched path (OLSP) determined by the network controller. In this embodiment, the network controller uses a constraint-based routing protocol [e.g., multi-protocol label switching (MPLS)] over one or more wavelengths to determine the best available OLSP to the egress node.

In one embodiment, the control label (also referred to herein as a control burst) is transmitted asynchronously ahead of the photonic data burst and on a different wavelength and/or different fiber. This scheme is also referred to herein as out of band (OOB) signaling. The time offset between the control burst and the data burst allows each of the switching nodes to process the label and configure the photonic burst switches to appropriately switch before the arrival of the corresponding data burst. The term photonic burst switch is used herein to refer to fast optical switches that do not use O-E-O conversion.

In one embodiment, ingress node 15$_1$ then asynchronously transmits the optical data bursts to the switching nodes where the optical data bursts experience little or no time delay and no O-E-O conversion within each of the switching nodes. The optical control burst is always sent before the corresponding optical data burst is transmitted.

In some embodiments, the switching node may perform O-E-O conversion of the control bursts so that the node can extract and process the routing information contained in the label. Further, in some embodiments, the TDM channel is propagated in the same wavelengths that are used for propagating labels. Alternatively, the labels and payloads can be modulated on the same wavelength in the same optical fiber using different modulation formats. For example, optical labels can be transmitted using non-return-to-zero (NRZ) modulation format, while optical payloads are transmitted using return-to-zero (RZ) modulation format. The optical burst is transmitted from one switching node to another switching node in a similar manner until the optical control and data bursts are terminated at egress node 18$_1$. A block 23 represents this operation.

The operational flow at this point depends on whether the target network is an optical WAN or a LAN. A block 24 represents this branch in the operational flow.

If the target network is an optical WAN, new optical label and payload signals are formed. In this embodiment, egress node 18$_1$ prepares the new optical label and payload signals. A block 25 represents this operation.

The new optical label and payload are then transmitted to the target network (i.e., WAN in this case). In this embodiment, egress node 18$_1$ includes an optical interface to transmit the optical label and payload to the optical WAN. A block 26 represents this operation.

However, if in block 24 the target network is a LAN, the optical data burst is disassembled to extract the IP packets. In this embodiment, egress node 18$_1$ converts the optical data burst to electronic signals that egress node 18$_1$ can process to recover the data segment of each of the packets. A block 27 represents this operation.

The extracted IP data packets are processed, combined with the corresponding IP labels, and then routed to the target network (i.e., LAN in this case). In this embodiment, egress node 18$_1$ forms these new IP packets. A block 28 represents this operation. The new IP packets are then transmitted to the target network (i.e., LAN) as shown in block 26.

PBS network 10 can achieve increased bandwidth efficiency through the additional flexibility afforded by the TDM channels. Although this exemplary embodiment described above includes an optical MAN having ingress, switching and egress nodes to couple multiple LANs to an optical WAN backbone, in other embodiments the networks do not have to be LANs, optical MANs or WAN backbones. That is, PBS network 10 may include a number of relatively small networks that are coupled to a relatively larger network that in turn is coupled to a backbone network.

Figure 3:
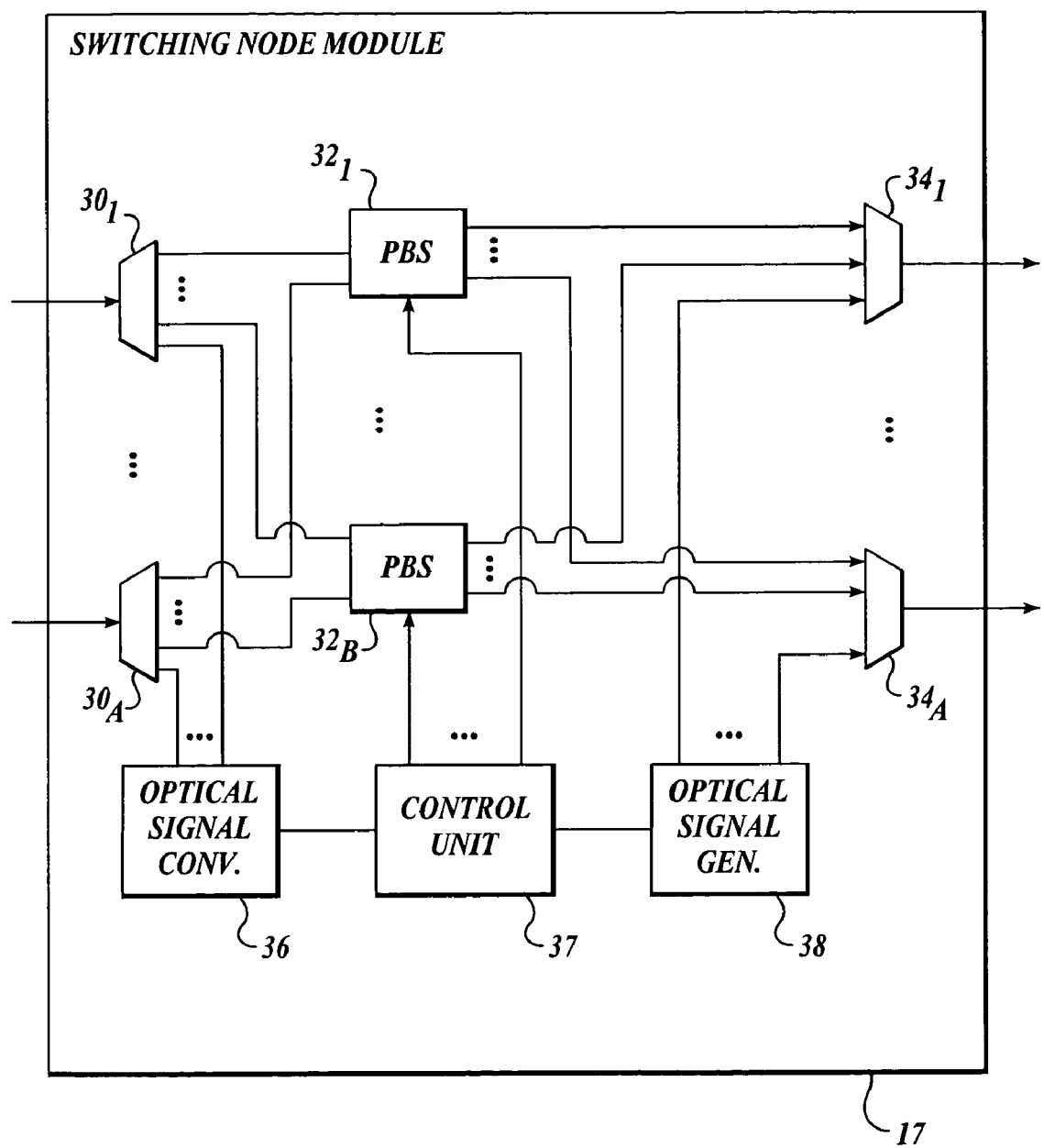
FIG. 3 is a block diagram illustrating a switching node module for use in a photonic burst switched network, according to one embodiment of the present invention.

FIG. 3 illustrates a module 17 for use as a switching node in photonic burst switched network 10 (FIG. 1), according to one embodiment of the present invention. In this embodiment, module 17 includes a set of optical wavelength division demultiplexers $30_1$-$30_A$, where A represents the number of input optical fibers used for propagating payloads, labels, and other network resources to the module. For example, in this embodiment, each input fiber could carry a set of C wavelengths (i.e., WDM wavelengths), although in other embodiments the input optical fibers may carry differing numbers of wavelengths. Module 17 would also include a set of N×N photonic burst switches $32_1$-$32_B$, where N is the number of input/output ports of each photonic burst switch. Thus, in this embodiment, the maximum number of wavelengths at each photonic burst switch is A C, where $N \geq A \cdot C + 1$. For embodiments in which N is greater than A·C, the extra input/output ports can be used to loop back an optical signal for buffering.

Further, although photonic burst switches $32_1$-$32_B$ are shown as separate units, they can be implemented as N×N photonic burst switches using any suitable switch architecture. Module 17 also includes a set of optical wavelength division multiplexers $34_1$-$34_A$, a set of optical-to-electrical signal converters 36 (e.g., photo-detectors), a control unit 37, and a set of electrical-to-optical signal converters 38 (e.g., lasers). Control unit 37 may have one or more processors to execute software or firmware programs.

Figure 10:
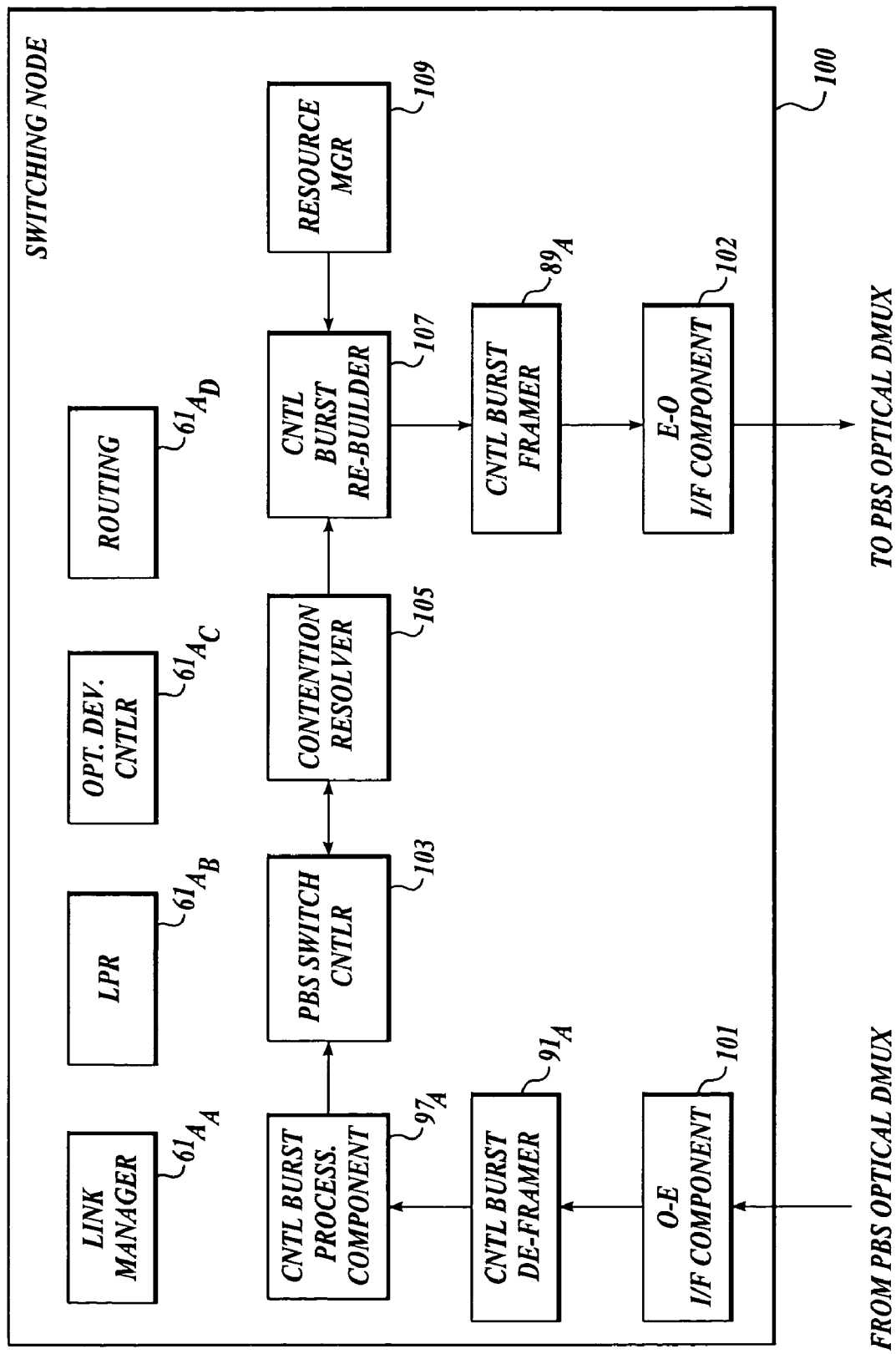
FIG. 10 is a block diagram illustrating some of the components of a switching node module, according to one embodiment of the present invention.

The elements of this embodiment of module 17 are interconnected as follows. Optical demultiplexers $30_1$-$30_A$ are connected to a set of A input optical fibers that propagate input optical signals from other switching nodes of photonic burst switched network 10 (FIG. 10). The output leads of the optical demultiplexers are connected to the set of B core optical switches $32_1$-$32_B$ and to optical signal converter 36. For example, optical demultiplexer $30_1$ has B output leads connected to input leads of the photonic burst switches $32_1$-$32_B$ (i.e., one output lead of optical demultiplexer 30, to one input lead of each photonic burst switch) and at least one output lead connected to optical signal converter 36.

The output leads of photonic burst switches $32_1$-$32_B$ are connected to optical multiplexers $34_1$-$34_A$. For example, photonic burst switch 32, has A output leads connected to input leads of optical multiplexers $34_1$-$34_A$ (i.e., one output lead of photonic burst switch 32, to one input lead of each optical multiplexer). Each optical multiplexer also an input lead connected to an output lead of electrical-to-optical signal converter 38. Control unit 37 has an input lead or port connected to the output lead or port of optical-to-electrical signal converter 36. The output leads of control unit 37 are connected to the control leads of photonic burst switches $32_1$-$32_B$ and electrical-to-optical signal converter 38. As described below in conjunction with the flow diagram of FIG. 5, module 17 is used to receive and transmit optical control bursts, optical data bursts, and network management control bursts. In one embodiment, the optical data bursts and optical control bursts have transmission formats as shown in FIGS. 4A and 4B.

Figure 4A:
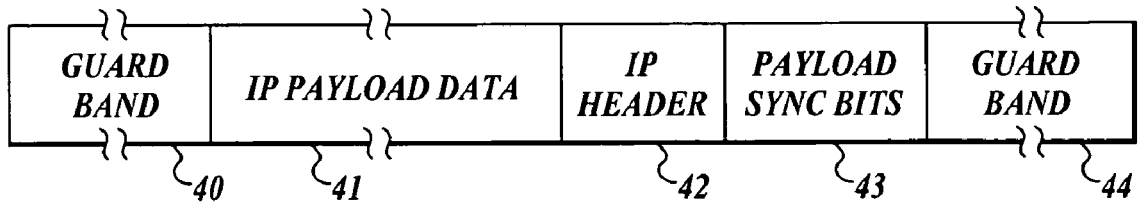
FIGS. 4A and 4B are diagram illustrating the format of an optical data burst and an optical control burst for use in a photonic burst-switched network, according to one embodiment of the present invention.

FIG. 4A illustrates the format of an optical data burst for use in PBS network 10 (FIG. 1), according to one embodiment of the present invention. In this embodiment, each optical data burst has a start guard band 40, an IP payload data segment 41, an IP header segment 42, a payload sync segment 43 (typically a small number of bits), and an end guard band 44 as shown in FIG. 4A. In some embodiments, IP payload data segment 41 includes the statistically-multiplexed IP data packets or Ethernet frames used to form the burst. Although FIG. 4A shows the payload as contiguous, module 17 transmits payloads in a TDM format. Further, in some embodiments the data burst can be segmented over multiple TDM channels. It should be pointed out that in this embodiment, the optical data bursts and optical control bursts have local significance only in PBS network 10, and may loose their significance at the optical WAN.

Figure 4B:
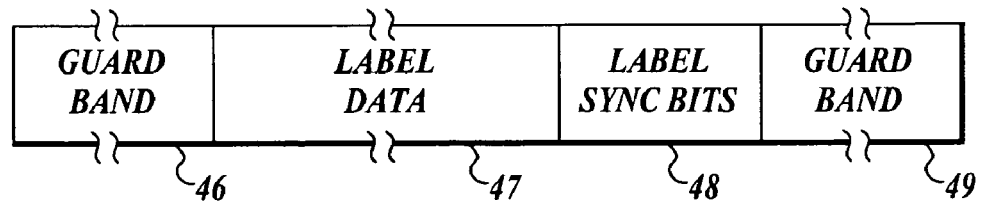

FIG. 4B illustrates the format of an optical control burst for use in photonic burst switched network 10 (FIG. 1), according to one embodiment of the present invention. In this embodiment, each optical control burst has a start guard band 46, an IP label data segment 47, a label sync segment 48 (typically a small number of bits), and an end guard band 49 as shown in FIG. 4B. In this embodiment, label data segment 45 contains all the necessary routing and timing information of the IP packets to form the optical burst. Although FIG. 4B shows the payload as contiguous, in this embodiment module 17 transmits labels in a TDM format.

In some embodiments, an optical network management control label (not shown) is also used in PBS network 10 (FIG. 1). In such embodiments, each optical network management control burst includes: a start guard band similar to start guard band 46; a network management data segment similar to data segment 47; a network management sync segment (typically a small number of bits) similar to label sync segment 48; and an end guard band similar to end guard band 44. In this embodiment, network management data segment contains network management information needed to coordinate transmissions over the network. In some embodiments, the optical network management control burst is transmitted in a TDM format.

Figure 5:
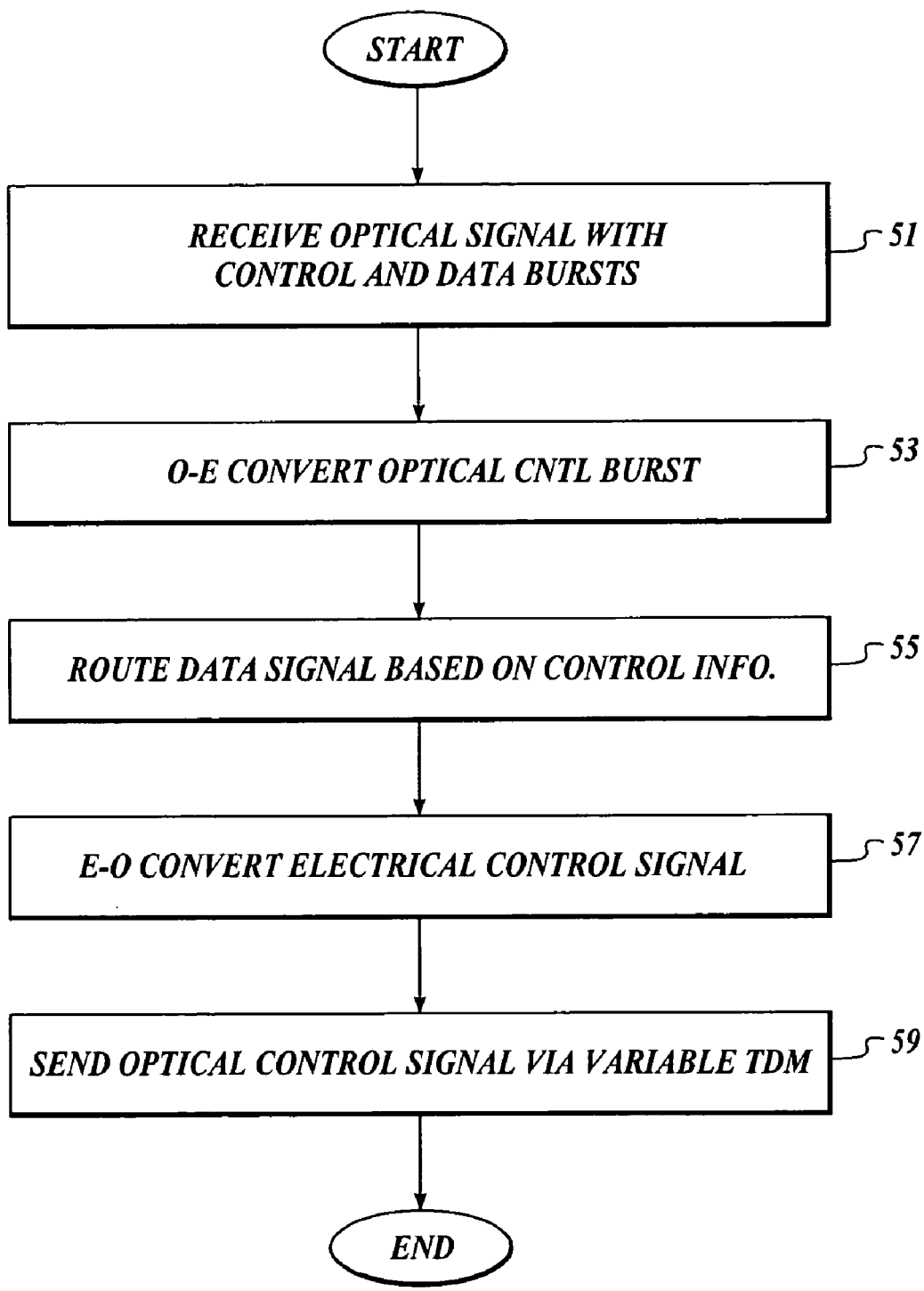
FIG. 5 is a flow diagram illustrating the operation of a switching node module, according to one embodiment of the present invention.

FIG. 5 illustrates the operational flow of module 17 (FIG. 3), according to one embodiment of the present invention. Referring to FIGS. 3 and 5, module 17 operates as follows.

Module 17 receives an optical signal with TDM label and data signals. In this embodiment, module 17 receives an optical control signal (e.g., an optical control burst) and an optical data signal (i.e., an optical data burst in this embodiment) at one or two of the optical demultiplexers. For example, the optical control signal may be modulated on a first wavelength of an optical signal received by optical demultiplexer $30_A$, while the optical data signal is modulated on a second wavelength of the optical signal received by optical demultiplexer $30_A$. In some embodiments, the optical control signal may be received by a first optical demultiplexer while the optical data signal is received by a second optical demultiplexer. Further, in some cases, only an optical control signal (e.g., a network management control burst) is received. A block 51 represents this operation.

Module 17 converts the optical control signal into an electrical signal. In this embodiment, the optical control signal is the optical control burst signal, which is separated from the received optical data burst signal by the optical demultiplexer and sent to optical-to-electrical signal converter 36. In other embodiments, the optical control signal can be a network management control burst (previously described in conjunction with FIG. 4B). Optical-to-electrical signal converter 36 converts the optical control signal into an electrical signal. For example, in one embodiment each portion of the TDM control signal is converted to an electrical signal. The electrical control signals received by control unit 37 are processed to form a new control signal. In this embodiment, control unit 37 stores and processes the information contained in the control signals. A block 53 represents this operation.

Module 17 then routes the optical data signals (i.e., optical data burst in this embodiment) to one of optical multiplexers $34_1$-$34_4$, based on routing information contained in the control signal. In this embodiment, control unit 37 processes the control burst to extract the routing and timing information and sends appropriate PBS configuration signals to the set of B photonic burst switches $32_1$-$32_B$ to re-configure each of the photonic burst switches to switch the corresponding optical data bursts. A block 55 represents this operation.

Module 17 then converts the processed electrical control signal to a new optical control burst. In this embodiment, control unit 37 provides TDM channel alignment so that reconverted or new optical control bursts are generated in the desired wavelength and TDM time slot pattern. The new control burst may be modulated on a wavelength and/or time slot different from the wavelength and/or time slot of the control burst received in block 51. A block 57 represents this operation.

Module 17 then sends the optical control burst to the next switching node in the route. In this embodiment, electrical-to-optical signal generator 38 sends the new optical control burst to appropriate optical multiplexer of optical multiplexers $34_1$-$34_4$ to achieve the route. A block 59 represents this operation.

Figure 6:
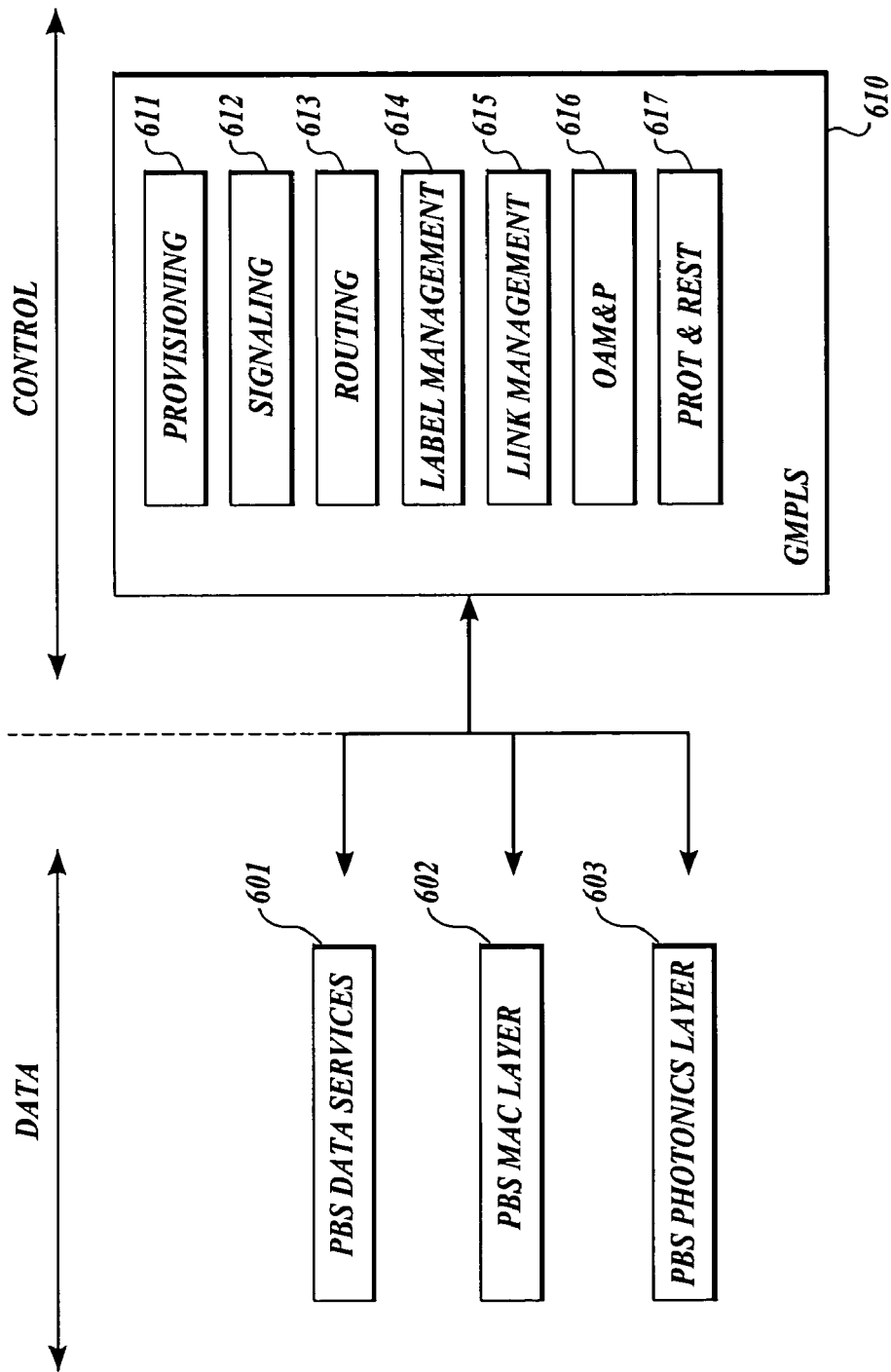
FIG. 6 is a diagram illustrating a generalized multi-protocol label switching (GMPLS)-based architecture for a PBS network, according to one embodiment of the present invention.

FIG. 6 illustrates a GMPLS-based architecture for a PBS network, according to one embodiment of the present invention. Starting with the GMPLS suite of protocols, each of the GMPLS protocols can be modified or extended to support the different PBS operations and optical interfaces while still incorporating the GMPLS protocols' various traffic-engineering tasks. The integrated PBS layer architecture include PBS data services layer 601 on top of a PBS MAC layer 602, which is on top of a PBS photonics layer 603. As is well known, the GMPLS suite (indicated by a block 610 in FIG. 6) include a provisioning component 611, a signaling component 612, a routing component 613, a label management component 614, a link management component 615, and a protection and restoration component 616. In some embodiments, these components are modified or have added extensions that support the PBS layers 601-603. Further, in this embodiment, GMPLS suite 610 is also extended to include an operation, administration, management and provisioning (OAM&P) component 617.

For example, signaling component 612 can include extensions specific to PBS networks such as, for example, burst start time, burst type, burst length, and burst priority, etc. Link management component 615 can be implemented based on the well known link management protocol (LMP) (that currently supports only SONET/SDH networks), with extensions added to support PBS networks. Protection and restoration component 617 can, for example, be tailored to cover PBS networks.

Further, for example, label management component 614 can be modified to support a PBS control channel label space. In one embodiment, the label operations are performed after control channel signals are O-E converted. The ingress nodes of the PBS network act as label edge routers (LERs) while the switching nodes act as label switched routers (LSRs). An egress node acts as an egress LER, substantially continuously providing all of the labels of the PBS network. This component can advantageously increase the speed of control channel context retrieval (by performing a pre-established label look-up instead of having to recover a full context).

Figure 6A:
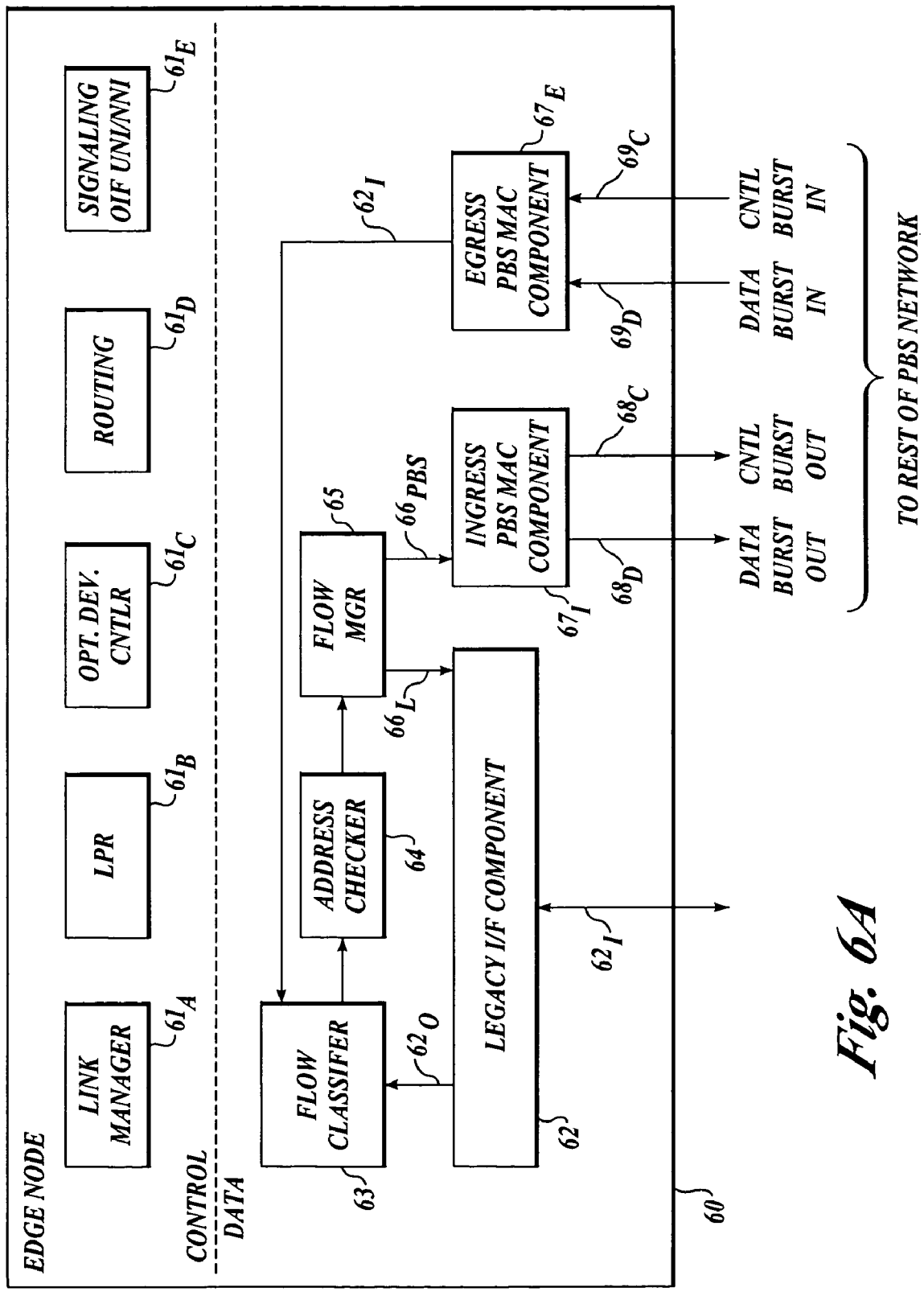
FIG. 6A is a block diagram illustrating some of the components of an edge node, according to one embodiment of the present invention.

FIG. 6A illustrates an embodiment of software architecture and selected components of an edge node 60, according to the integrated PBS layer architecture of FIG. 6. In this embodiment of the present invention, the illustrated software architecture and components of edge node 60 are implemented using machine-readable instructions that cause a machine (e.g., a processor) to perform operations that allow the edge node to transfer information to and from the PBS network.

In this embodiment, the software architecture of edge node 60 includes a control plane (the term "plane" is used in this context to indicate a logical partition rather than a geometric or physical characteristic) having a link manager 61A, a link protector and restorer (LPR) $61_B$, an optical device controller $61_C$, a routing component $61_D$ and a signaling component $61_E$. These components are standard components that interact with PBS network on a control channel, and are well known in the art. For example, link manager $61_A$ provides PBS network transport link status information (e.g., the link is operating or not operating). In one embodiment, link manager $61_A$ communicates over the control channel using a protocol similar to the well-known link management protocol (LMP), or using LMP with extensions for to support PBS networks (which may be standardized in the future). LPR $61_B$ computes alternate paths in the PBS network when a link failure is detected. Optical device controller $61_C$ provides operation, administration, management and provisioning functions for the intelligent optical device in which edge node 60 is implemented. Routing component $61_D$ provides routing information so that data (e.g., IP packets or Ethernet frames) can be routed to its intended destination (e.g., outside of PBS network 10). Signaling component $61_E$ provides signaling functions to support physical interfaces such as, for example, an optical internetworking forum (OIF)-compliant user-to-network interface (UNI) (e.g., UNI 1.0 Specification, December, 2001), or a network-to-network interface (NNI).

This embodiment of edge node 60 also includes a data plane having a legacy interface component 62, a flow classifier 63, an address checker 64, a flow manager 65, an ingress PBS media access control (MAC) layer component $67_1$ and an egress PBS MAC layer component $67_E$. The acronym "MAC" is used for components $67_1$ and $67_E$ because the functions performed by these components are traditionally performed by layer 2 of the standard International Organization for Standardization (ISO) seven-layer model. Other embodiments of the present invention need not conform to the ISO seven-layer model. Edge node 60 transfers external information (i.e., from outside PBS network 10 of FIG. 1) to the PBS network as described below in conjunction with FIG. 7.

Figure 7:
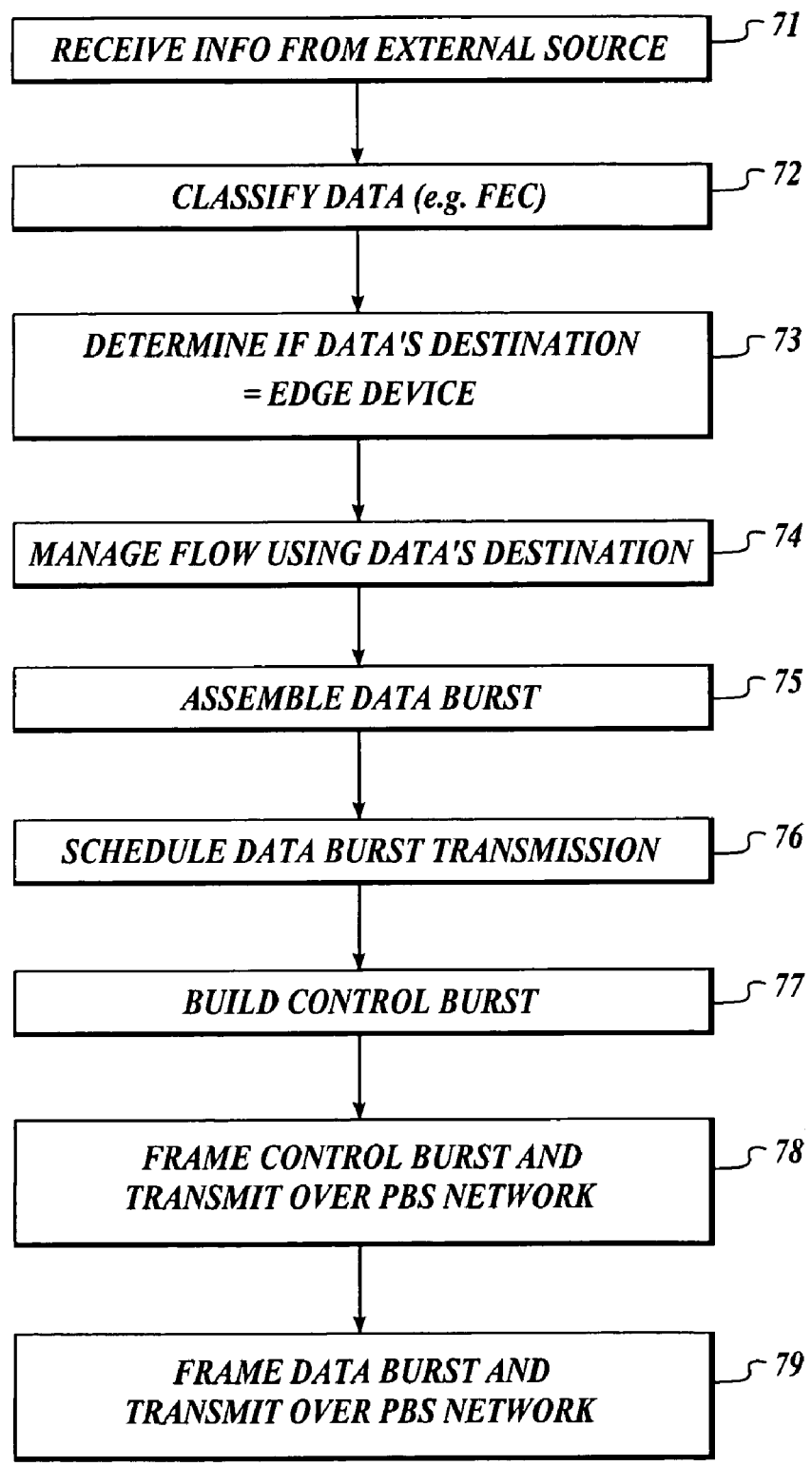
FIG. 7 is a flow diagram illustrating the operational flow of the components of FIG. 6, according to one embodiment of the present invention.

FIG. 7 illustrates the operational flow of the components of edge node 60 (FIG. 6) in receiving external information, according to one embodiment of the present invention. Referring to FIGS. 6 and 7, in a block 71, edge node 60 receives external information via a physical interface (not shown) coupled to the external network (not shown). In this embodiment, legacy interface component 62 can send and receive information via the physical interface as indicated by double-headed arrow 621. In some embodiments, the external data can be in the form of IP packets or Ethernet frames, for example.

In a block 72, the information is then classified. In this embodiment, flow classifier 63 classifies the information into forward-equivalent classes (FECs) using standard techniques (e.g., n-tuples classification), when the information has associated FECs. If the information does not have associated FECs (e.g., normal IP traffic), the information simply passes through flow classifier 63 without being classified. In some embodiments, flow classifier 63 includes a datastore (not shown) containing the FECs. As is well known, the FECs are used by the multi-protocol label switching (MPLS) protocol suite to define the next hop (i.e., the next node in the flow of data). Otherwise, if no classification had been used, the IP address must be used.

In a block 73, edge node 60 determines whether the information's destination is the device or module in which edge node 60 is implemented. In this embodiment, address checker 64 determines if the information is addressed to the device. For example, in one embodiment, address checker 64 analyzes the IP address contained in the information to determine if it matches the device's IP address. In such an embodiment, address checker 64 includes a standard layer three (L3) Forward component (i.e., the IP address is a layer 3 address in the ISO seven-layer model). If the information is intended for the device, then the device processes the information and the operational flow for that information is essentially complete. However, if the information is not intended for the device, the operational flow continues to a block 74.

In block 74, edge node 60 manages the information flow based on the destination (e.g., derived from the FEC provided by flow classifier 63 or from the IP address for regular IP traffic). For example, the destination may be the external network (i.e., external from PBS network 10) from which the information was received. Continuing this example, the information may have been an IP "ping", which the device would then acknowledge via legacy interface component 62 as indicated by an arrow $66_L$ in FIG. 6. For such "external network" information, the operational flow is substantially complete after the information is transmitted. If the information's destination is reached via PBS network 10, the information is sent to ingress PBS MAC layer component $67_1$ as indicated by an arrow $66_{PBS}$ in FIG. 6. The operational flow then continues to a block 75.

In block 75, the information is assembled into one or more data bursts. In this embodiment, ingress PBS MAC layer component $67_1$ assembles the data bursts to be optically transmitted over PBS network 10 (FIG. 1). In one embodiment, the size of the data burst is determined based on the traffic type (e.g., may be determined from the FEC). In a further refinement, if the FEC of the information matches the FEC of previously processed information (i.e., a data burst is already being formed for that FEC), ingress PBS MAC layer component $67_1$ can simply append the information to the previously formed data burst, thereby increasing processing speed.

In a block 76, edge node 60 schedules the data burst transmission over PBS network 10. In this embodiment, ingress PBS MAC layer component $67_1$ generates a bandwidth request for insertion into the control burst associated with the data burst being formed.

In a block 77, the control burst is then built using information such as the required bandwidth, burst scheduling time, in-band or out-of-band signaling, burst destination address, data burst length, data burst channel wavelength, offset time, priorities, and the like.

In a block 78, the control burst is then framed and transmitted over PBS network 10. In this embodiment, ingress PBS MAC layer component $67_1$ frames the control burst. For example, ingress PBS MAC layer component $67_1$ can use standard generic framing procedure (GFP) framing techniques that are well known in the art. In other embodiments, different framing techniques/procedures may be used. The control burst is then transmitted over PBS network 10 via a physical optical interface (not shown), as indicated by an arrow 68$_C$.

In a block 79, the data burst is framed and then transmitted according to the schedule generated in block 76. In this embodiment, ingress PBS MAC layer component 67$_1$ frames the data burst in a manner similar to that described in block 78. The data burst is then transmitted over PBS network 10 via the physical optical interface when scheduled, as indicated by an arrow 68$_D$.

Figure 8:
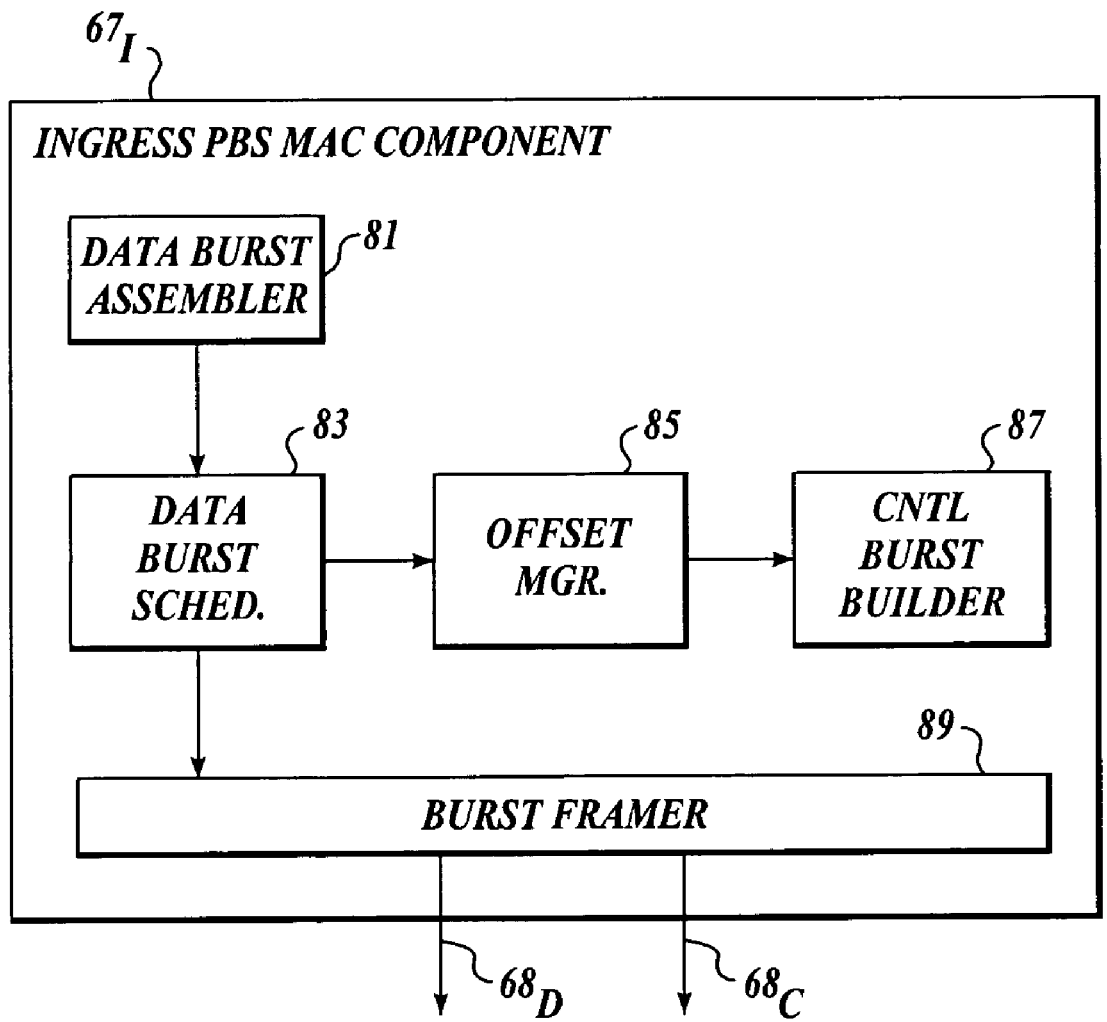
FIG. 8 is a block diagram illustrating some of the components of an ingress PBS MAC layer component, according to one embodiment of the present invention.

FIG. 8 illustrates selected components of ingress PBS MAC layer component 67$_1$, according to one embodiment of the present invention. In this embodiment, ingress PBS MAC layer component 67$_1$ includes a data burst assembler 81, a data burst scheduler 83, an offset time manager 85, a control burst builder 87 and a burst framer 89. In one embodiment, data burst assembler 81 performs the operations of block 75 (FIG. 7) described above. Data burst scheduler 83, in this embodiment, performs the operations of block 76 (FIG. 7). In one embodiment, data burst scheduler 83 generates the schedule to include an offset time to allow for the various nodes in PBS network 10 to process the control burst before the data burst arrives. In one embodiment, offset manager 85 determines the offset time based on various network parameters such as, for example, the number of hops along the lightpath, the processing delay at each switching node, traffic loads for specific lightpaths, and class of service requirements. Then control burst builder 87, in this embodiment, performs the operations of block 77. Burst framer 89 then performs the operations of blocks 78 and 79.

FIGS. 6-8 as described above provide the operational flow in receiving external data. The operational flow in receiving information from PBS network 10 is now described in conjunction with FIGS. 6 and 9.

Figure 9:
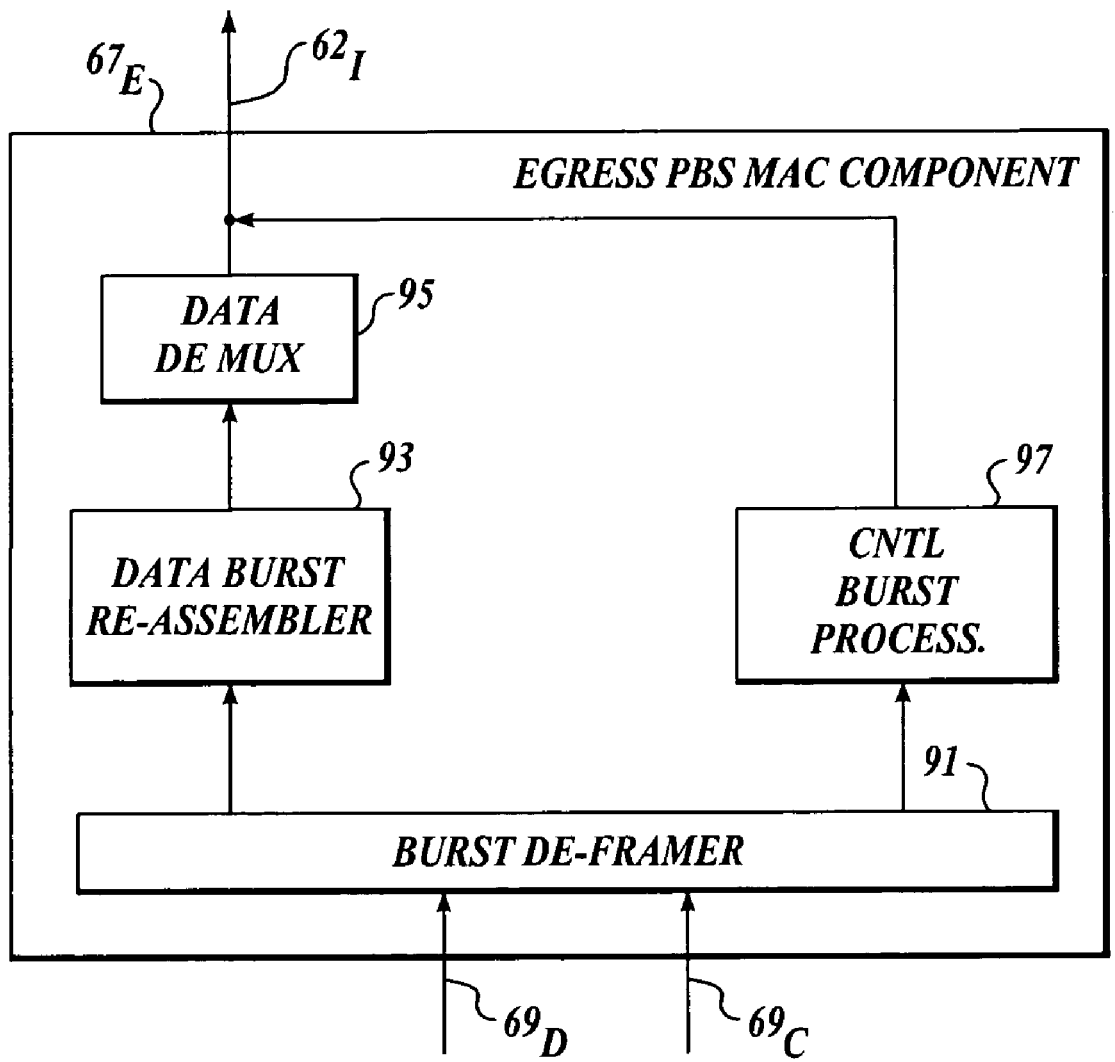
FIG. 9 is a block diagram illustrating some of the components of an egress PBS MAC layer component, according to one embodiment of the present invention.

FIG. 9 illustrates components of egress PBS MAC component 67$_E$, according to one embodiment of the present invention. In this embodiment, egress PBS MAC component 67$_E$ includes a burst de-framer 91, a data burst re-assembler 93, a data burst demultiplexer 95, and a control burst processing component 97.

In operation in receiving "new" information from PBS network 10, edge node 60 receives a control burst via the aforementioned physical optical interface (not shown) as indicated by arrow 69$_C$ in FIGS. 6 and 9. In this embodiment, burst de-framer 91 receives and de-frames the control burst. In some embodiments, the received control burst is processed to extract information about the data burst associated with the control burst (e.g., the length of the burst, destination address, etc.). In one embodiment, control burst processing component 97 processes the de-framed control burst to extract the pertinent control/address information, which can then be provided to flow classifier 63 (FIG. 6) as indicated by an arrow 62$_1$ in FIGS. 6 and 9. Flow classifier 63 can then determine the FEC if the traffic is MPLS traffic, or simply pass the traffic if the traffic is regular IP traffic.

After the control burst is received, edge node 60 receives the data burst(s) corresponding to the received control burst. Typically, the data burst is received shortly after the control burst. In a manner similar to that described above for received control bursts, burst de-framer 91 receives and de-frames the data burst. Data burst re-assembler 93 then processes the de-framed data burst to extract the data (and to re-assemble the data if the data burst was a fragmented data burst). Data de-multiplexer 95 then appropriately de-multiplexes the extracted data. The de-multiplexed data is then provided to flow classifier 63 (FIG. 6) as indicated by arrow 62$_1$ in FIGS. 6 and 9. Flow classifier 63 can then classify the data, using the control information corresponding to the data, which control burst processing component 97 previously sent to flow classifier 63.

FIG. 10 illustrates the software architecture and selected components of a switching node module 100, according to one embodiment of the present invention. In this embodiment, the illustrated software architecture and selected components of switching node module 100 are implemented using machine-readable instructions that cause a machine (e.g., a processor) to perform operations that allow the module to transfer information to and from other nodes in the PBS network. As previously described, switching node modules perform O-E-O processing of control bursts, but optically switch data bursts via hardware. Thus, the components of switching node module 100 described below are directed for the most part to processing of control bursts (and are not related to handling of data bursts).

In this embodiment, switching node module 100 includes a link manager 61A$_A$, a LPR 61A$_B$, an optical device controller 61A$_C$, and a routing component 61A$_D$, which are substantially similar to link manager 61$_A$, LPR 61$_B$, optical device controller 61$_C$, and routing component 61$_D$, respectively, described above in conjunction with FIG. 6. In addition, switching node module 100 includes a control burst framer 89A, a control burst de-framer 91A and a control burst processing component 97A, which are similar to burst framer 89 (FIG. 8), burst de-framer 91 (FIG. 9), and control burst processing component 97 (FIG. 9). Further, switching node module 100 includes optical-electrical (O-E) interface component 101, an electrical-optical (E-O) interface component 102, a PBS switch controller component 103, a contention resolver 105, a control burst re-builder 107, and a resource manager 109.

In operation, an optical control burst is received via a physical optical interface (not shown) and optical switch (not shown) and converted to electrical signals (i.e., O-E conversion). O-E interface component 101 receives the converted control burst signals and provides them to control burst de-framer 91A. Control burst de-framer 91A de-frames the control burst information and provides the control information to control burst processing component 97A. Control burst processing component 97A processes the information, determining the corresponding data burst's flow classification, bandwidth reservation, next control hop (e.g., from the FEC), control label swapping, etc.

PBS switch controller component 103 uses some of this information to control and configure the optical switch (not shown) to switch the optical data burst at the appropriate time to the next node at the proper channel. In this embodiment, if the reserved bandwidth is not available, contention resolver 105 takes appropriate action. For example, contention resolver 105 can: (a) determine a different lightpath to avoid the unavailable optical channel (e.g., deflection routing); (b) delay the data bursts using integrated buffering elements within the PBS switch fabric such as fiber delay lines; (c) use a different optical channel (e.g. by using tunable wavelength converters); and/or (d) drop the coetaneous data bursts. Contention resolver may also send a negative acknowledgment message back to the edge node to re-transmit the dropped burst. If the data burst is dropped, the operational flow is in effect completed.

However, if the bandwidth can be found and reserved for the data burst, contention resolver 105 provides information of the contention resolution to PBS switch controller component 103 for appropriate control of the PBS switch (not shown). In addition, control burst re-builder 107 generates a new control burst based on: (a) the updated reserved bandwidth from control burst processing component 97A and/or contention resolver 105, and (b) available PBS network resources from resource manager 109. Control burst framer 89A then frames the re-built control burst, which is then optically transmitted via E-O interface component 102, the physical optical interface (not shown) and the optical switch (not shown).

Subsequently, when the optical data burst corresponding to the received/processed control burst is received by switching node module 100, the optical switch is already configured to switch the optical data burst to the next node in the routing.

Embodiments of method and apparatus for implementing a photonic burst switched network are described herein. In the above description, numerous specific details are set forth to provide a thorough understanding of embodiments of the invention. One skilled in the relevant art will recognize, however, that embodiments of the invention can be practiced without one or more of the specific details, or with other methods, components, materials, etc. For example, new signaling extensions can be implemented in signaling component $61_C$ (FIG. 6) that are specific to the PBS network (e.g., burst start time, burst type, burst length, burst priority, etc.). For example, the signaling protocol can be RSVP-TE (resource reservation protocol-traffic engineering) modified with the aforementioned extensions to add quality-of-service (QoS) capability to the PBS network. In other instances, well-known structures, materials, or operations are not shown or described in detail to avoid obscuring this description.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable optical manner in one or more embodiments.

Thus, embodiments of this invention may be used as or to support software program executed upon some form of processing core (such as the CPU of a computer or a processor of a module) or otherwise implemented or realized upon or within a machine-readable medium. A machine-readable medium includes any mechanism for storing or transmitting information in a form readable by a machine (e.g., a computer). For example, a machine-readable medium can include such as a read only memory (ROM); a random access memory (RAM); a magnetic disk storage media; an optical storage media; and a flash memory device, etc. In addition, a machine-readable medium can include propagated signals such as electrical, optical, acoustical or other form of propagated signals (e.g., carrier waves, infrared signals, digital signals, etc.).

In the foregoing specification, embodiments of the invention have been described. It will, however, be evident that various modifications and changes may be made thereto without departing from the broader spirit and scope as set forth in the appended claims. The specification and drawings are, accordingly, to be regarded in an illustrative rather than a restrictive sense.

What is claimed is:

1. An apparatus for use in a wavelength-division multiplexed (WDM) photonic burst switched (PBS) network, the apparatus comprising:
   a bidirectional interface to send and to receive information to and from another network other than the PBS network;
   a flow classifier to classify the information sent to and receive from the bidirectional interface;
   an ingress PBS component to transmit control and data information over the PBS network via an optical switch;
   a flow manager coupled to selectively output the information to the bidirectional interface if the classification by the flow classifier determines that the information is destined for the other network or to output the information to the ingress PBS component if the classification by the flow classifier determines that the information is to be transmitted over the PBS network; and
   an address checker linked between the flow classifier and the flow manager to determine whether information received at the apparatus is addressed to the apparatus.

2. The apparatus of claim 1 further comprising an egress PBS component to deframe information received from the PBS network and provide the information received from the PBS network to the flow classifier.

3. The apparatus of claim 1 wherein the ingress PBS component further comprises:
   a data burst assembler to form a data burst from information received from the flow manager;
   a data burst scheduler to schedule transmission of the data burst formed by the data burst assembler;
   an offset time manager to provide a time delay between transmission of the control burst and transmission of the data burst using information from the data burst scheduler;
   a control burst builder to form a control burst using information from the data burst scheduler and the offset time manager; and
   a burst framer to frame the control and data burst from the data burst assembler and the control burst builder.

4. The apparatus of claim 2 wherein the egress PBS component further comprises:
   a burst de-framer to de-frame control and data bursts received via the PBS network;
   a control burst processing component to process control burst information from the burst de-framer;
   a data burst re-assembler to process data burst information from the burst de-framer; and
   a data demultiplexer to demultiplex processed data burst information from the data burst re-assembler.

5. A system comprising:
   a first network; and
   a photonic burst switched (PBS) network coupled to the first network, the PBS network further comprising an edge node that includes;
   a bidirectional interface to send and receive information to and from the first network;
   a flow classifier to classify the information sent to and received from the bidirectional interface;
   an ingress PBS component to transmit control and data information over the PBS network via an optical switch;
   an egress PBS component to deframe information received from the PBS network and provide the information received from the PBS network to the flow classifier;
   a flow manager coupled to selectively output the information to the bidirectional interface if the classification by the flow classifier determines that the information is destined for the other network or to output the information to the ingress PBS component if the classification by the flow classifier determines that the information is to be transmitted over the PBS network; and an address checker linked between the flow classifier and the flow manager to determine whether information received at the edge node is addressed to the edge node.

6. The system of claim 5 wherein the flow manager is further to selectively provide information received via the flow classifier to the bidirectional interface.

7. The system of claim 5 wherein the ingress PBS component further comprises:
- a data burst assembler to form a data burst from information received from the flow manager;
- a data burst scheduler to schedule transmission of the data burst formed by the data burst assembler;
- an offset time manager to provide a delay between transmission of the control burst and transmission of the data burst using information from the data burst scheduler;
- a control burst builder to form a control burst using information from the data burst scheduler and the offset time manager; and
- a burst framer to frame the control and data burst from the data burst assembler and the control burst builder.

8. The system of claim 5 wherein the egress PBS component further comprises:
- a burst de-framer to de-frame control and data bursts received via the PBS network;
- a control burst processing component to process control burst information from the burst de-framer;
- a data burst re-assembler to process data burst information from the burst de-framer; and
- a data demultiplexer to demultiplex processed data burst information from the data burst re-assembler.

* * * * *